(12) United States Patent
Gajjar

(10) Patent No.: US 8,782,519 B1
(45) Date of Patent: Jul. 15, 2014

(54) SYSTEMS AND METHODS FOR ARCHIVING AND DISPLAYING LENGTHY DOCUMENTS BASED ON CONTENT PRIORITY LEVELS

(75) Inventor: Hiten Gajjar, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 148 days.

(21) Appl. No.: 13/282,728

(22) Filed: Oct. 27, 2011

(51) Int. Cl.
*G06F 17/00* (2006.01)

(52) U.S. Cl.
USPC .......................................... 715/273; 715/200

(58) Field of Classification Search
USPC .................................................. 715/200, 273
See application file for complete search history.

(56) References Cited

U.S. PATENT DOCUMENTS

| | | | | |
|---|---|---|---|---|
| 6,026,368 A * | 2/2000 | Brown et al. | ............... | 705/14.56 |
| 6,735,740 B2 * | 5/2004 | Sakai et al. | .................. | 715/273 |
| 7,085,999 B2 * | 8/2006 | Maeda et al. | .................. | 715/236 |
| 7,478,321 B2 * | 1/2009 | Baudisch et al. | ............. | 715/243 |
| 7,707,487 B2 * | 4/2010 | Easter et al. | .................. | 715/225 |
| 7,814,553 B2 * | 10/2010 | Kawabata et al. | ............... | 726/27 |
| 8,209,605 B2 * | 6/2012 | Poston et al. | .................. | 715/273 |
| 8,244,697 B2 * | 8/2012 | Brannon et al. | ............. | 707/695 |
| 8,266,653 B2 * | 9/2012 | Emura et al. | ..................... | 725/46 |
| 8,332,754 B2 * | 12/2012 | DeLuca et al. | ................. | 715/273 |
| 8,479,092 B1 * | 7/2013 | Pandey | .......................... | 715/252 |
| 2007/0192333 A1 * | 8/2007 | Ali | ................................ | 707/10 |
| 2008/0109719 A1 * | 5/2008 | Osawa et al. | ................. | 715/273 |
| 2008/0120152 A1 * | 5/2008 | McCrea | ........................... | 705/7 |
| 2009/0031218 A1 * | 1/2009 | Wang | ............................ | 715/273 |
| 2009/0154815 A1 * | 6/2009 | Fujiwara | ...................... | 382/229 |
| 2009/0187843 A1 * | 7/2009 | Itoh | .............................. | 715/769 |
| 2009/0300506 A1 * | 12/2009 | Drucker et al. | ............... | 715/738 |
| 2012/0192196 A1 * | 7/2012 | Yasuda | .......................... | 718/103 |
| 2012/0230537 A1 * | 9/2012 | Takahashi et al. | ............ | 382/103 |
| 2012/0324418 A1 * | 12/2012 | Fallon | ............................ | 717/101 |
| 2012/0330944 A1 * | 12/2012 | Vailaya et al. | ................. | 707/723 |
| 2013/0060751 A1 * | 3/2013 | Cooke | ........................... | 707/709 |

OTHER PUBLICATIONS

Damiani et al., A Fine-Graind Access Control System for XML Documents, ACM 2002, pp. 169-202.*
Mohan et al., Adapting Multimedia Internet Content for Universal Access, IEEE 1999, pp. 104-114.*
IBM, A method, system, and model for implementing an annotation-based task-oriented email system to automate action-oriented team collaborations, http://ip.com/IPCOM/000177926, as accessed on May 18, 2011.
Nikesh N., Tag based Information Retrieval using foksonomy, http://www.slideshare.net/nikeshn/foksonomy-information-retrieval-3235600, as accessed on May 18, 2011.

* cited by examiner

*Primary Examiner* — Cong-Lac Huynh
(74) *Attorney, Agent, or Firm* — ALG Intellectual Property, LLC

(57) ABSTRACT

A computer-implemented method for archiving and displaying lengthy documents based on content priority levels may include (1) identifying a document that is to be archived, (2) identifying at least one section of content within the document, (3) identifying a priority level associated with the section of content within the document that prioritizes access to the section of content relative to at least one other section of content within the document, (4) archiving the document based at least in part on the priority level associated with the section of content, and (5) providing prioritized access to content within the archived document in accordance with the priority level associated with the section of content in order to allow a user to access a portion of the archived document without having to access the entire archived document. Various additional methods, systems, and encoded computer-readable media are also disclosed.

20 Claims, 8 Drawing Sheets

SYSTEMS AND METHODS FOR ARCHIVING AND DISPLAYING LENGTHY DOCUMENTS BASED ON CONTENT PRIORITY LEVELS

BACKGROUND

Enterprises are often concerned with how best to manage the volume of emails and other documents that they and their employees amass during the course of doing business. For example, a typical employee may, on a daily basis, send and/or receive tens if not hundreds of emails and may create many other documents. For legal or other information retention reasons, an enterprise may need to retain these emails and documents in a manageable and efficient way.

Enterprises may use a variety of document archiving technologies as a way to manage the retention of large numbers of emails and documents. For example, an enterprise may use an email archiving system to reduce the number of emails stored on an employee's computing device by storing the emails on an archiving server.

Once an email is sent to the archiving server, the employee may be required to retrieve the entire email from the archiving server before the email can be viewed, which, depending on the size of the email, may waste time (especially when retrieval is made over a slow network connection) and/or waste system resources (e.g., system bandwidth). This may be especially true for an employee that may only need a portion of the email.

Furthermore, if the employee retrieves the email from a computing device with a small screen, the employee may have a difficult time browsing the email for relevant information. Accordingly, the instant disclosure identifies and addresses a need for systems and methods for archiving and displaying lengthy documents based on content priority levels.

SUMMARY

As will be described in greater detail below, the instant disclosure generally relates to systems and methods for archiving and displaying lengthy documents based on content priority levels. In one example, a computer-implemented method for accomplishing such a task may include (1) identifying a document that is to be archived, the document including a plurality of sections of content, (2) identifying at least one section of content within the document, (3) identifying a priority level associated with the section of content within the document, the priority level prioritizing access to the section of content relative to at least one other section of content within the document, (4) archiving the document based at least in part on the priority level associated with the section of content, and then (5) providing prioritized access to content within the archived document in accordance with the priority level associated with the section of content in order to allow a user to access a portion of the archived document without having to access the entire archived document.

In certain embodiments, the step of identifying the priority level associated with the section of content may include identifying a prioritization tag that has been associated with the section of content by the user, while the step of archiving the document may include archiving the document based at least in part on the prioritization tag associated with the section of content. In this embodiment, the prioritization tag may identify the priority level associated with the section of content.

In another embodiment, the method may further include, prior to identifying the prioritization tag that has been associated with the section of content by the user, (1) receiving, from an administrator, a set of prioritization tags defined by the administrator, and then (2) allowing the user to associate the prioritization tag with the section of content. In this embodiment, each prioritization tag within the above mentioned set of prioritization tags may identify a priority level that has been defined by the administrator, and the set of prioritization tags may include the prioritization tag.

In various embodiments, the step of archiving the document may include storing, in a document archive, the document, prioritization information that indicates the priority level of the section of content, and/or a prioritization tag associated with the section of content. In this embodiment, the prioritization tag may identify the priority level associated with the section of content. In at least one embodiment, a portion of the document archive may be maintained on a server and/or a client of the user.

In some embodiments, the step of providing prioritized access to content within the archived document may include (1) displaying, to the user, a shortcut to the archived document, the shortcut including a link to the archived document stored in the document archive, (2) receiving, from the user, a request to access the archived document using the shortcut to the archived document, (3) in response to receiving the request to access the archived document, retrieving, from the document archive, a portion of the archived document, and then (4) displaying, to the user, a portion of the archived document that has been retrieved from the document archive.

In this embodiment, the retrieved portion of the document may include a retrieval-prioritized portion of the archived document and/or the entire archived document. The retrieval-prioritized portion of the archived document may include one or more retrieval-prioritized sections of content that have priority levels indicating that the one or more retrieval-prioritized sections of content should be retrieved prior to the entire archived document being retrieved Similarly, the displayed portion of the document may include the retrieval-prioritized portion of the archived document, a display-prioritized portion of the archived document, and/or at least one content placeholder. In this embodiment, the display-prioritized portion of the archived document may include one or more display-prioritized sections of content that have priority levels indicating that the one or more display-prioritized sections of content should be displayed prior to the entire archived document being displayed, while the content placeholder may reference one or more low-priority sections of content that have priority levels indicating that the one or more low-priority sections of content should not be displayed prior to the display-prioritized portion of the archived document being displayed.

In certain embodiments, the method may further include (1) receiving, from the user, a request to access a low-priority section of content referenced by the content placeholder and then, in response to receiving the request to access the low-priority section of content, (2) retrieving, from the document archive, the low-priority section of content and/or the entire archived document, and (3) displaying, to the user, the low-priority section of content and/or the entire archived document.

In other embodiments, the step of providing prioritized access to content within the archived document may include displaying, to the user, a preview of the archived document. In this embodiment, the preview of the archived document may include a display-prioritized portion of the archived document and/or a content placeholder. The display-prioritized portion of the archived document may include one or more display-prioritized sections of content that have priority levels indicating that the one or more display-prioritized sections of content should be displayed prior to the entire archived document being retrieved, and the content placeholder may reference one or more low-priority sections of content that have priority levels indicating that the one or more low-priority sections of content should not be retrieved prior to the display-prioritized portion of the archived document being displayed.

After displaying the preview of the archived document, the step of providing prioritized access to content within the archived document may further include (1) receiving, from the user, a request to access a low-priority section of content referenced by the content placeholder and/or the entire archived document, (2) in response to receiving the request, retrieving, from the document archive, the low-priority section of content and/or the entire archived document, and then (3) displaying, to the user, the low-priority section of content or the entire archived document.

In some embodiments, the document may be generated using a document template. The document template may include at least one section of pre-composed content that is associated with a predetermined priority level. In this embodiment, the step of identifying the section of content within the document may include identifying the section of pre-composed content within the document, and the step of identifying the priority level associated with the section of content within the document may include identifying the predetermined priority level associated with the section of pre-composed content.

In other embodiments, the step of identifying the section of content within the document may include (1) identifying a prioritization rule that includes a content-section identifier and/or a predetermined priority level associated with the content-section identifier and (2) identifying the section of content using the content-section identifier. The predetermined priority level may prioritize access to sections of content identified using the content-section identifier. In this embodiment, the step of identifying the priority level associated with the section of content within the document may include identifying the predetermined priority level associated with the content-section identifier and associating the predetermined priority level with the section of content.

In various embodiments, the priority level may indicate: a retrieval-prioritization of the section of content, a display-prioritization of the section of content, when the section of content should be displayed relative to the other section of content, when the section of content should be retrieved from the document archive relative to the other section of content, that the section of content should be displayed prior to the other section of content being displayed, that the section of content should not be displayed prior to the other section of content being displayed, that the section of content should be retrieved from the document archive prior to the other section of content being retrieved, and/or that the section of content should not be retrieved from the document archive prior to the other section of content being retrieved.

In certain embodiments, the document may include an email, a text document, a presentation document, a spreadsheet document, a document attachment, and/or an email attachment. In at least one embodiment, the method may further include updating the priority level associated with the section of content.

In one embodiment, a system for implementing the above-described method may include (1) a document-identification module programmed to identify a document that is to be archived, the document including a plurality of sections of content, (2) a content-identification module programmed to identify at least one section of content within the document, (3) a priority-identification module programmed to identify a priority level associated with the section of content within the document, the priority level prioritizing access to the section of content relative to at least one other section of content within the document, (4) a document-archive module programmed to archive the document based at least in part on the priority level associated with the section of content, and (5) a prioritized-access module programmed to provide prioritized access to content within the archived document in accordance with the priority level associated with the section of content in order to allow a user to access a portion of the archived document without having to access the entire archived document. The system may also include at least one processor configured to execute the document-identification module, the content-identification module, the priority-identification module, the document-archive module, and/or the prioritized-access module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a document that is to be archived, the document including a plurality of sections of content, (2) identify at least one section of content within the document, (3) identify a priority level associated with the section of content within the document, the priority level prioritizing access to the section of content relative to at least one other section of content within the document, (4) archive the document based at least in part on the priority level associated with the section of content, and (5) provide prioritized access to content within the archived document in accordance with the priority level associated with the section of content in order to allow a user to access a portion of the archived document without having to access the entire archived document.

As will be explained in greater detail below, by archiving and displaying lengthy documents based on content priority levels, the systems and methods disclosed herein may be able to help a user more efficiently archive and view lengthy documents. For example, the systems and methods disclosed herein may allow a user to retrieve a lengthy archived document more efficiently from a document archive by allowing the user to retrieve only prioritized sections (e.g., the most relevant sections) of the lengthy archived document, which may reduce retrieval times (especially when retrieval is made over a slow network connection) and/or conserve system resources (e.g., system bandwidth). In another example, the systems and methods disclosed herein may allow the user to view a lengthy archived document more efficiently by allowing the user to view only prioritized sections of the lengthy archived document, which may allow the user to focus on and/or identify information within the lengthy archived document that is most important and/or relevant to the user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
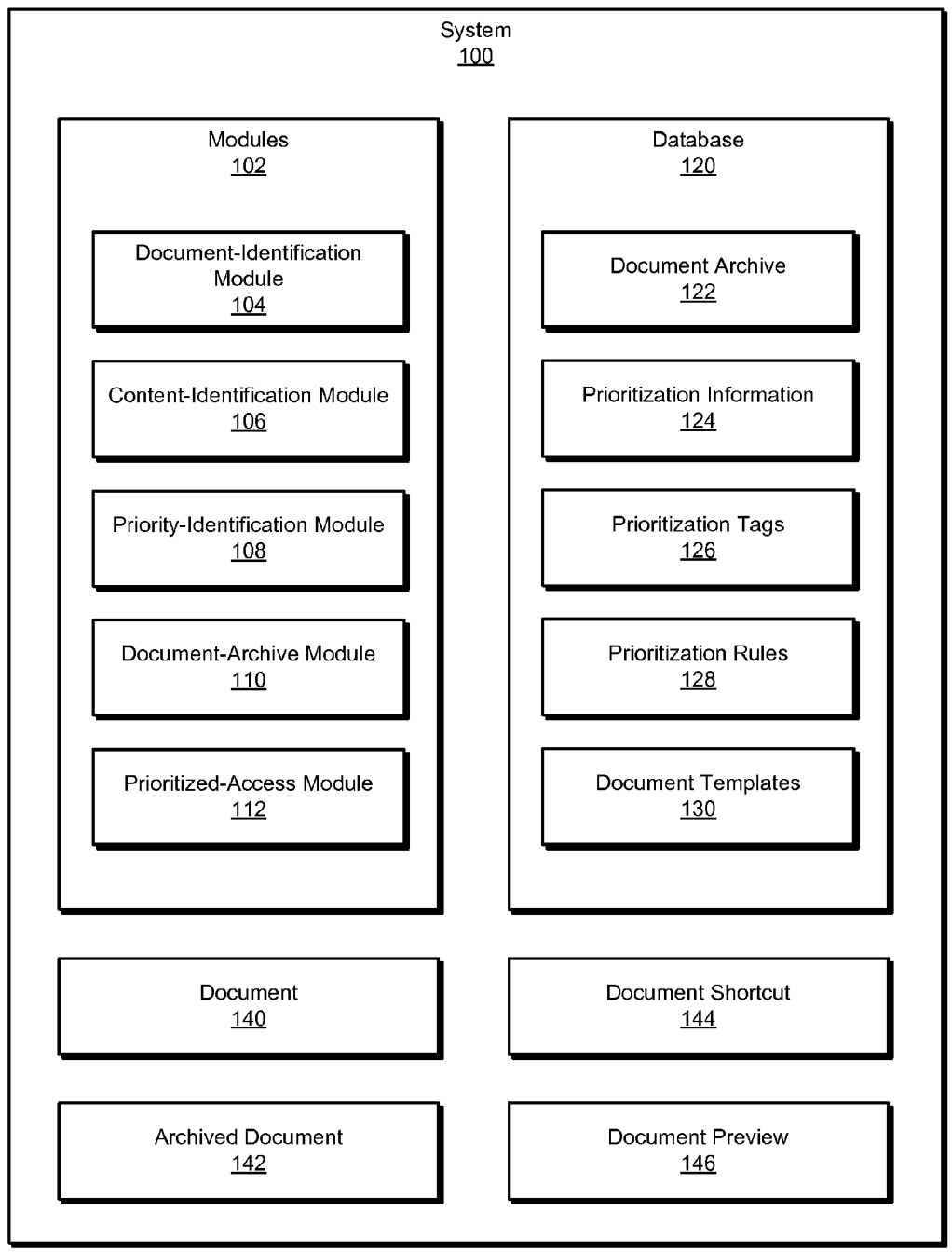
FIG. 1 is a block diagram of an exemplary system for archiving and displaying lengthy documents based on content priority levels.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
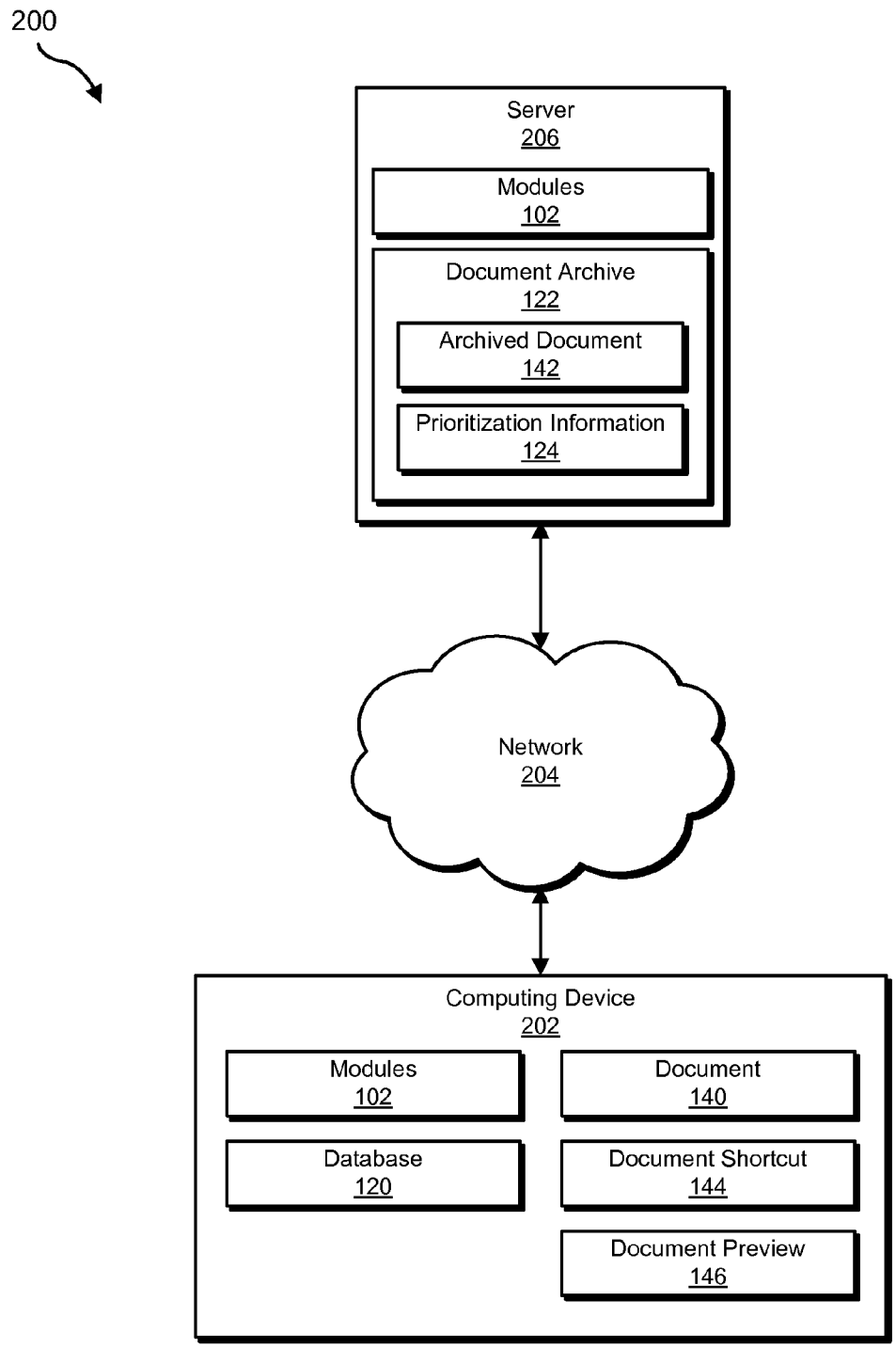
FIG. 2 is a block diagram of an exemplary system for archiving and displaying lengthy documents based on content priority levels.

The following will provide, with reference to FIGS. 1-2, detailed descriptions of exemplary systems for archiving and displaying lengthy documents based on content priority levels. Detailed descriptions of corresponding computer-implemented methods will also be provided in connection with FIG. 3. In addition, detailed descriptions of an exemplary document, an exemplary document preview, and an exemplary prioritized document will be provided in connection with FIGS. 4-6. Furthermore, detailed descriptions of an exemplary computing system and network architecture capable of implementing one or more of the embodiments described herein will be provided in connection with FIGS. 7 and 8, respectively.

FIG. 1 is a block diagram of an exemplary system 100 for archiving and displaying lengthy documents based on content priority levels. As illustrated in this figure, exemplary system 100 may include one or more modules 102 for performing one or more tasks. For example, and as will be explained in greater detail below, exemplary system 100 may include a document-identification module 104 programmed to identify a document that is to be archived. Exemplary system 100 may also include a content-identification module 106 programmed to identify at least one section of content within the document.

In addition, and as will be described in greater detail below, exemplary system 100 may include a priority-identification module 108 programmed to identify a priority level associated with the section of content within the document. In one example, the priority level may prioritize access to the section of content relative to at least one other section of content within the document.

In addition, and as will be described in greater detail below, exemplary system 100 may include a document-archive module 110 programmed to archive the document based at least in part on the priority level associated with the section of content. Exemplary system 100 may also include a prioritized-access module 112 programmed to provide prioritized access to content within the archived document in accordance with the priority level associated with the section of content in order to allow a user to access a portion of the archived document without having to access the entire archived document. Although illustrated as separate elements, one or more of modules 102 in FIG. 1 may represent portions of a single module or application.

In certain embodiments, one or more of modules 102 in FIG. 1 may represent one or more software applications or programs and/or one or more extensions, add-ons, or plug-ins that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 710 in FIG. 7, and/or portions of exemplary network architecture 800 in FIG. 8. In one example, one or more of modules 102 may include a general purpose document archiving system (e.g., an email archiving system or a file archiving system). One or more of modules 102 in FIG. 1 may also represent all or portions of one or more special-purpose computers configured to perform one or more tasks.

As illustrated in FIG. 1, exemplary system 100 may also include one or more databases, such as database 120. For example, and as will be explained in greater detail below, database 120 may include a document archive 122 for storing archived documents, sections of content within the archived documents, and/or prioritization tags and/or prioritization information associated with archived documents. Database 120 may also include prioritization information 124 for storing prioritization information associated with documents (e.g., a priority level assigned by a user to a section of content within a document). In addition, database 120 may include prioritization tags 126 for storing prioritization tag information (e.g., prioritization tags and/or priority levels associated with prioritization tags). Database 120 may further include prioritization rules 128 for storing prioritization rule information, and document templates 130 for storing document template information.

Database 120 may represent portions of a single database or computing device or a plurality of databases or computing devices. For example, database 120 may represent a portion of server 206 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as server 206 in FIG. 2, computing system 710 in FIG. 7, and/or portions of exemplary network architecture 800 in FIG. 8.

As illustrated in FIG. 1, exemplary system 100 may further include a document 140 and an archived document 142. Document 140 generally represents any form of archivable information including a plurality of sections of content, while archived document 142 generally represents any document that has been archived. For example, archived document 142 may represent document 140 after document 140 has been transferred to document archive 122, stored to document archive 122, or otherwise archived by the systems and methods described herein.

In addition, and as will be described in greater detail below system 100 may include a document shortcut 144 and/or a document preview 146. Document shortcut 144 and document preview 146 generally represent any means of referencing and/or accessing an archived document. An example of document preview 146 is provided in FIG. 5.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204.

In one embodiment, one or more of modules 102 from FIG. 1 may, when executed by at least one processor of a computing device (such as, e.g., computing device 202 and/or server 206), enable this computing device to archive and/or display lengthy documents based on content priority levels. For example, and as will be described in greater detail below, one or more of modules 102 may cause computing device 202 (either alone or in combination with server 206) to (1) identify document 140 that is to be archived to document archive 122, (2) identify at least one section of content within document 140, (3) identify a priority level associated with the section of content within document 140 that prioritizes access to the section of content relative to at least one other section of content within document 140, (4) archive document 140, as archived document 142, to document archive 122 based at least in part on the priority level associated with the section of content, and then (5) provide prioritized access to content within archived document 142 in accordance with the priority level associated with the section of content in order to allow a user to access a portion of archived document 142 without having to access the entire archived document 142.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 710 in FIG. 7, or any other suitable computing device.

Server 206 generally represents any type or form of computing device that is capable of reading computer-executable instructions and performing one or more of the steps described herein. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a metropolitan area network (MAN), a local area network (LAN), a personal area network (PAN), the Internet, power line communications (PLC), a cellular network (e.g., a GSM Network), exemplary network architecture 800 in FIG. 8, or the like. Network 204 may facilitate communication or data transfer using wireless or wired connections. In one embodiment, network 204 may facilitate communication between computing device 202 and server 206.

In one example, computing device 202 may represent a computing device within an organization or enterprise, and server 206 may represent a document-archiving server to which computing devices within the organization or enterprise archive documents.

Figure 3:
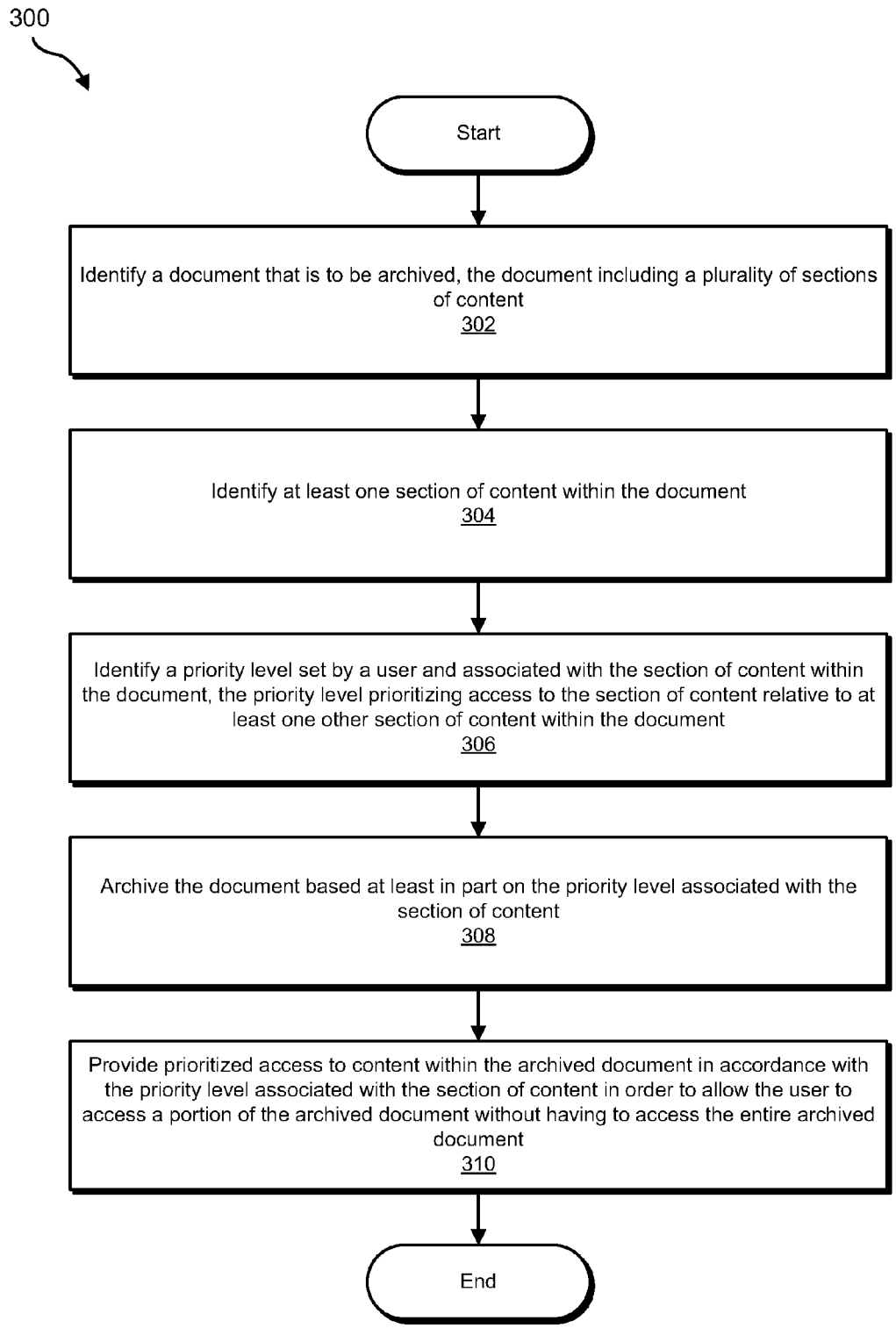
FIG. 3 is a flow diagram of an exemplary method for archiving and displaying lengthy documents based on content priority levels.

FIG. 3 is a flow diagram of an exemplary computer-implemented method 300 for archiving and displaying lengthy documents based on content priority levels. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302, the systems described herein may identify a document that is to be archived that includes a plurality of sections of content. For example, document-identification module 104 may, as part of computing device 202 and/or server 206, identify document 140 that is to be archived to server 206.

As used herein, the terms "document" and "lengthy document" may refer to any form of archivable information that contains one or more sections of content. Examples of a document may include, without limitation, an email, a text document, a presentation document, a spreadsheet document, a document attachment, an email attachment, a webpage, a website, an audio file, a video file, an image, and/or any other file that contains one or more sections of content.

As used herein, the term "section of content" may refer to any portion, component, division, sequence, part, section or segment of a document and/or any combination thereof. For example, a section of content may include one or more pages, one or more paragraphs, one or more sentences, one or more words, and/or one or more characters contained within a document. In another example, a section of content may include all content within a document and/or the entire document.

Figure 4:
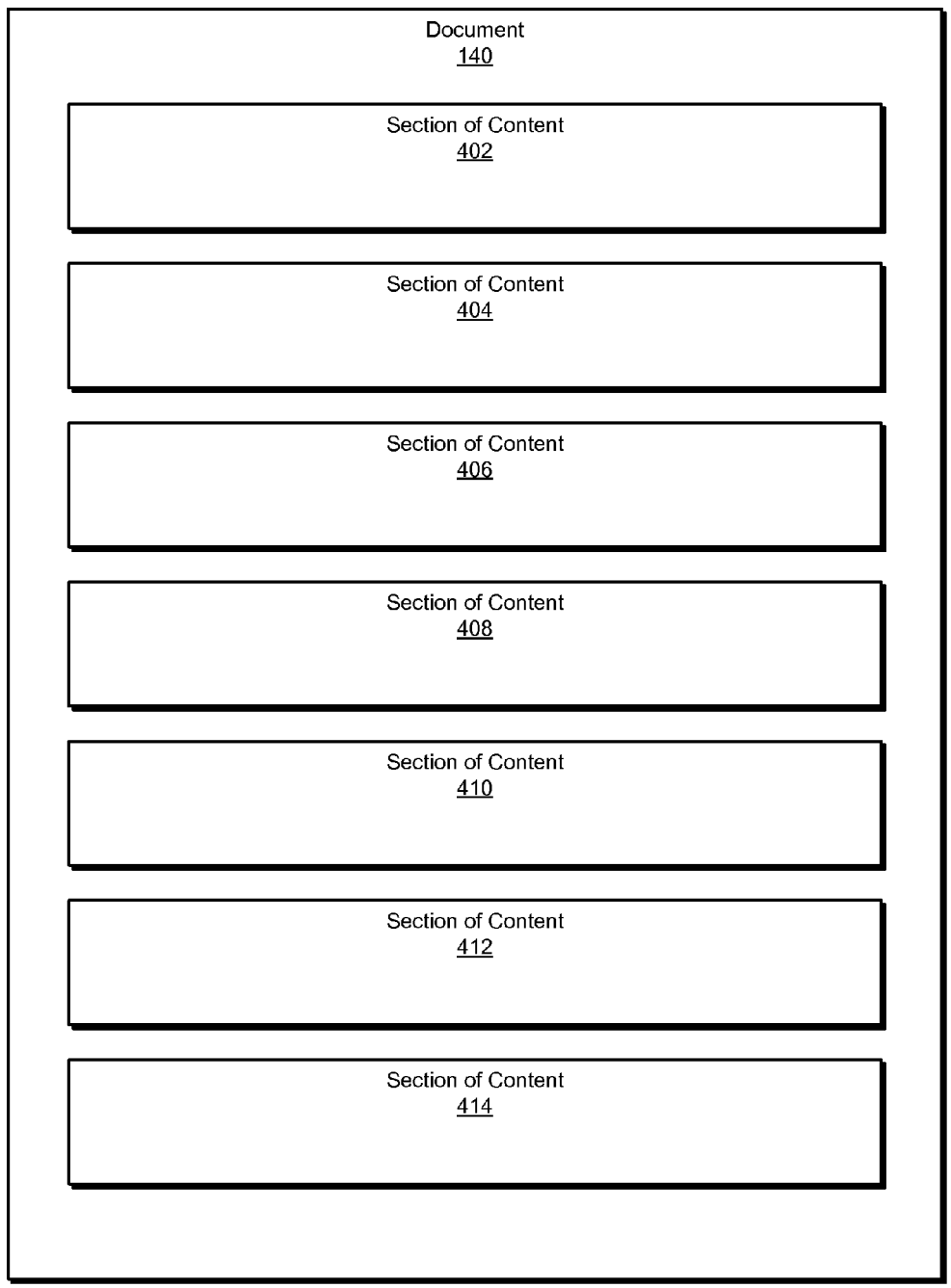
FIG. 4 is an illustration of an exemplary document.

An example of a document containing one or more sections of content is provided in FIG. 4. FIG. 4 is an illustration of an exemplary configuration of document 140 of FIG. 1. As illustrated in this figure, exemplary document 140 may include sections of content 402-414. In one example, document 140 may represent a text document, and sections of content 402-414 may represent one or more pages, one or more paragraphs, one or more sentences, one or more words, and/or one or more characters contained within the text document.

In another example, document 140 may represent an email and sections of content 402-414 may represent one or more paragraphs, one or more sentences, one or more words, one or more characters, and/or one or more images contained within the email.

Although shown in FIG. 4 as distinct and separate portions of document 140, sections of content may include at least a portion of another sections of content. For example, a section of content may include one or more sub-sections of content.

Returning to FIG. 3, the systems described herein may perform step 302 in a variety of ways. In one embodiment, document-identification module 104 may identify document 140 when document 140 is accessed by a user. In one example, document-identification module 104 may represent one or more extensions, add-ons, or plug-ins to one or more host applications (e.g., an email client, a document editor, a file browser). For example, document-identification module 104 may represent an email client extension that allows a user to create, prioritize, and archive emails while using the email client. In this example, document-identification module 104 may identify document 140 when a user performs one of these tasks.

In other embodiments, document-identification module 104 may identify document 140 as part of determining whether to use a prioritization rule to automatically prioritize document 140. For example, when a user accesses document 140, document-identification module 104 may determine whether to apply a prioritization rule contained in prioritization rules 128 to document 140. Document-identification module 104 may also determine whether to apply a prioritization rule to document 140 at other times (e.g., when document 140 is archived).

In certain embodiments, a prioritization rule may contain information used to identify documents that the prioritization rule should be applied to. For example, a prioritization rule may specify a file type, a document header value, a document category, and/or other document attributes. In this example, document-identification module 104 may determine whether to apply a prioritization rule to document 140 by determining that the document attributes specified in the prioritization rule match attributes of document 140.

In another embodiment, document-identification module 104 may identify document 140 when access to document 140 is prioritized. For example, document-identification module 104 may identify document 140 by receiving a request from a user to prioritize content within document 140.

In other embodiments, document-identification module 104 may identify document 140 when document 140 is archived or is to be archived. For example, document-identification module 104 may be part of a general document archiving system (e.g., an email archiving system or file archiving system). In this example, document-identification module 104 may identify any or all of the documents that are to be archived by the general document archiving system.

In other embodiments, document-identification module 104 may identify document 140 when document 140 is created. For example, a user may automatically prioritize access to document 140 by creating document 140 using a document template contained in document templates 130 that includes pre-composed content (e.g., pre-composed words, sentences, paragraphs, forms, images, macros, or layouts) that is already associated with a predetermined priority level. For example, a document template may include a pre-composed form that is associated with a high priority level or boilerplate information that is associated with a low priority level. In this example, document-identification module 104 may identify document 140 by detecting the creation of document 140 using the document template.

At step 304, the systems described herein may identify at least one section of content within the document. For example, content-identification module 106 may, as part of computing device 202 and/or server 206, identify at least one of sections of content 402-414 within document 140.

The systems described herein may perform step 304 in a variety of ways. In one embodiment, content-identification module 106 may identify the section of content by allowing a user to identify a section of content within document 140 for the purpose of associating a priority level with the section of content. For example, content-identification module 106 may allow a user to identify a section of content by tagging the section of content with a prioritization tag.

In other embodiments, as mentioned above, document 140 may be generated using a document template that includes one or more sections of pre-composed content. In this embodiment, content-identification module 106 may identify the section of content within document 140 by identifying the section of pre-composed content within document 140.

In other embodiments, when document 140 has been identified using a prioritization rule, content-identification module 106 may identify the section of content within document 140 by first identifying the prioritization rule used to identify document 140, and then by identifying the section of content using the content-section identifier contained within the prioritization rule. For example, a content-section identifier may include a keyword, sentence, or paragraph that may be used to identify the section of content.

In at least one embodiment, content-identification module 106 may identify the section of content within document 140 by identifying a priority level associated with the section of content. For example, content-identification module 106 may determine that a priority level has been associated with the section of content by determining that there is a prioritization tag associated with the section of content, and/or that there is other prioritization information associated with the section of content.

At step 306, the systems described herein may identify a priority level associated with the section of content within the document. For example, priority-identification module 108 may, as part of computing device 202 and/or server 206, identify a priority level associated with a section of content identified as part of step 304. In this example, the priority level may prioritize access to the section of content relative to at least one other section of content within the document.

As used herein, the term "priority level" may refer to any means of distinguishing between a first section of content and a second section of content for the purpose of prioritizing access to the first section of content relative to the second section of content. In various embodiments, a priority level associated with a section of content may indicate how document archive module 110 should archive the document as part of step 308, and/or how prioritized-access module 112 should provide prioritized access to the document as part of step 310.

In one embodiment, a priority level may indicate a retrieval-prioritization. For example, a retrieval-prioritization of a section of content may include a prioritization rank (e.g., rank 1, rank 2, etc.) or a prioritization order (e.g., first, second, third, etc.). In one example, the retrieval-prioritization may be used to determine the order in which sections of content within a document should be retrieved.

Similarly, a priority level may indicate when the section of content should be retrieved from a document archive relative to another section of content. For example, a priority level may indicate that the section of content should be retrieved when a user first requests access to a document, or that the section of content should be retrieved when the user requests access to the section of content.

Additionally or alternatively, a priority level may indicate that the section of content should be retrieved from the document archive prior to another section of content being retrieved or that the section of content should not be retrieved from the document archive prior to another section of content being retrieved. For example, a priority level may indicate that prioritized-access module 112 should include or exclude the section of content when retrieving a portion of an archived document.

In other embodiments, a priority level may indicate a display-prioritization of the section of content. For example, a display-prioritization of a section of content may include a prioritization rank (e.g., rank 1, rank 2, etc.) or an prioritization order (e.g., first, second, third, etc.). In one example, the display-prioritization may be used to determine the order in which sections of content within a document should be displayed.

Similarly, the priority level may indicate when the section of content should be displayed relative to other sections of content. For example, a priority level may indicate that the section of content should be displayed when a user first requests access to a document, or that the section of content should be displayed when the user requests access to the section of content.

Additionally or alternatively, the priority level may indicate that the section of content should be displayed prior to another section of content being displayed or that the section of content should not be displayed prior to another section of content being displayed. For example, a priority level may indicate that prioritized-access module 112 should include or exclude a section of content when displaying an archived document to a user.

In a variety of embodiments, a priority level may be associated with a section of content using prioritization tags, document annotations, placeholders, prioritization rules, document templates, any combination thereof, and/or any other labeling mechanism.

The systems described herein may identify a priority level associated with the section of content within document 140 in a variety of ways. For example, priority-identification module 108 may allow a user to associate a priority level with the section of content identified as part of step 304.

In one embodiment, priority-identification module 108 may allow a user to associate a prioritization tag that identifies a priority level with the section of content. Priority-identification module 108 may then identify the priority level associated with the section of content by identifying the priority level associated with the prioritization tag that has been associated with the section of content by the user.

In some embodiments, prior to identifying the prioritization tag that has been associated with the section of content by the user, priority-identification module 108 may (1) receive, from an administrator, a set of prioritization tags defined by the administrator, wherein each prioritization tag within the set of prioritization tags identifies a priority level that has been defined by the administrator, (2) store the set of prioritization tag in prioritization tags 126, and then (3) allow the user to associate one of prioritization tags 126 with the section of content. An administrator may refer to any user with authority to create, modify, add, remove, and/or otherwise manage prioritization tags. In one example, an administrator may further determine which prioritization tags within prioritization tags 126 a user and/or a group of users may view and/or assign to sections of content within documents.

As used herein, the term "prioritization tag" refers to any mechanism used to associate a priority level with a section of content. Examples of prioritization tags may include, without limitation, descriptive labels, document annotations, placeholders, prioritization rules, document templates, any combination thereof, and/or any other labeling mechanism associated with one or more priority levels. In one example, prioritization tags may use descriptive labels (e.g., "Include Section" and/or "Exclude Section"). In another example, prioritization tags may use category labels (e.g., "Important" or "Not Important"). In yet another example, prioritization tags may use business-logic labels (e.g., "Management Value," "Personal Value," or "Finance Value").

In one example, an administrator may define a prioritization tag by defining a label and then associating a priority level with the label. For example, an administrator may define a prioritization tag using the label "Include Section." The administrator may then assign to the label "Include Section" a priority level indicating that a section of content associated with the label should be retrieved and/or displayed when a user first requests access to a document containing the section of content.

In other embodiments, priority-identification module 108 may identify the priority level associated with the section of content by identifying prioritization information in prioritization information 124 associated with the section of content or by identifying prioritization tags in prioritization tags 126 associated with the section of content.

As mentioned above, in some embodiments, a portion of the document may be generated using a document template (e.g., a document template from document templates 130) that includes at least one section of pre-composed content that is associated with a predetermined priority level. In this embodiment, priority-identification module 108 may identify a priority level associated with a section of content by (1) identifying the section of content within the document by identifying the section of pre-composed content within the document, and then by (2) identifying the priority level associated with the section of content within the document by identifying the predetermined priority level associated with the section of pre-composed content.

As mentioned above, in some embodiments a prioritization rule may be used to prioritize content within a document. In such embodiments, priority-identification module 108 may identify a priority level associated with the section of content by (1) identifying a prioritization rule contained in prioritization rules 128 that includes a content-section identifier and a predetermined priority level associated with the content-section identifier, and then by (2) identifying the section of content using the content-section identifier. Priority-identification module 108 may then identify the priority level associated with the section of content within the document by (1) identifying the predetermined priority level associated with the content-section identifier, and then (2) associating the predetermined priority level with the section of content.

In at least one embodiment, priority-identification module 108 may further update the priority level associated with the section of content. For example, priority-identification module 108 may allow a user to modify a priority level associated with a section of content of document 140 by allowing the user to remove, rename, or delete a prioritization tag associated with the section of content.

At step 308, the systems described herein may archive the document based at least in part on the priority level associated with the section of content. For example, document-archive module 110 may, as part of computing device 202 and/or server 206, archive document 140 based at least in part on the priority levels associated with sections of content 402-414.

The systems described herein may perform step 308 in a variety of ways. For example, document-archive module 110 may archive document 140, archive one or more of sections of content 402-414, archive prioritization information (e.g., priority levels and/or prioritization tags associated with sections of content 402-414), and/or set up prioritized access to document 140.

In one embodiment, document-archive module 110 may archive document 140 based on priority levels associated with sections of content 402-414 by storing a copy of document 140 (i.e., archived document 142) in document archive 122 and by storing prioritization information (e.g., information identifying the priority levels associated with sections of content 402-414 and information relating the priority levels to sections of content 402-414) in prioritization information 124.

Document-archive module 110 may, after storing archived document 142 in document archive 122, set up prioritized access to archived document 142 by creating a way to access archived document 142. For example, in one embodiment, document-archive module 110 may replace document 140 on computing device 202 with a document shortcut (e.g., document shortcut 144). Document shortcut 144 may include a link or other accessible reference to archived document 142 stored in document archive 122.

In another embodiment, document-archive module 110 may replace document 140 on computing device 202 with a document preview (e.g., document preview 146) of archived document 142. For example, document-archive module 110 may create document preview 146 by creating a new document on computing device 202 that includes a display-prioritized portion of archived document 142 and/or at least one content placeholder. In this example, the display-prioritized portion of archived document 142 may include one or more display-prioritized sections of content that have priority levels indicating that the one or more display-prioritized sections of content should be displayed prior to the entire archived document being retrieved. Additionally, the content placeholder may reference one or more low-priority sections of content that have priority levels indicating that the one or more low-priority sections of content should not be retrieved prior to the display-prioritized portion of archived document 142 being displayed.

In various embodiments, a user and/or an administrator may specify what sections of content should be included and/or excluded in the document preview prior to document-archive module 110 creating the document preview. For example, a user may request that document previews include all sections of content with prioritization levels above a specified level. In another example, the user may request that document previews include all sections of content that are associated with one or more specified prioritization tags.

Figure 5:
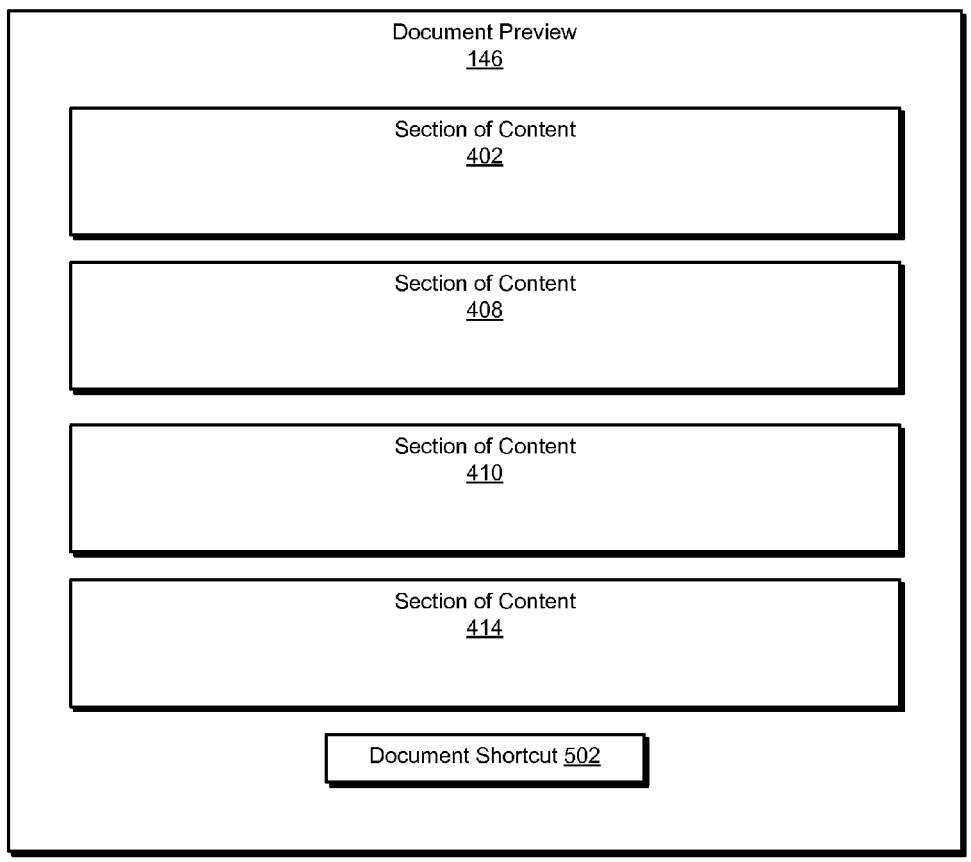
FIG. 5 is an illustration of an exemplary document preview.

An example of document preview 146 is provided in FIG. 5. FIG. 5 is an illustration of an exemplary configuration of document preview 146 of FIG. 1. As illustrated in this figure, document preview 146 may include sections of content 402, 408, 410, and 414. In this example, sections of content 402, 408, 410, and 414 represent display-prioritized sections of content of archived document 142 that have priority levels indicating that they should be displayed prior to the entire archived document 142 being retrieved.

In addition, document preview 146 may include a document shortcut 502. Document shortcut 502 may represent a content placeholder that references sections of content 404, 406, and 412 of archived document 142 that have priority levels indicating that they should not be retrieved prior to sections of content 402, 408, 410, and 414 of archived document 142 being displayed.

Figure 6:
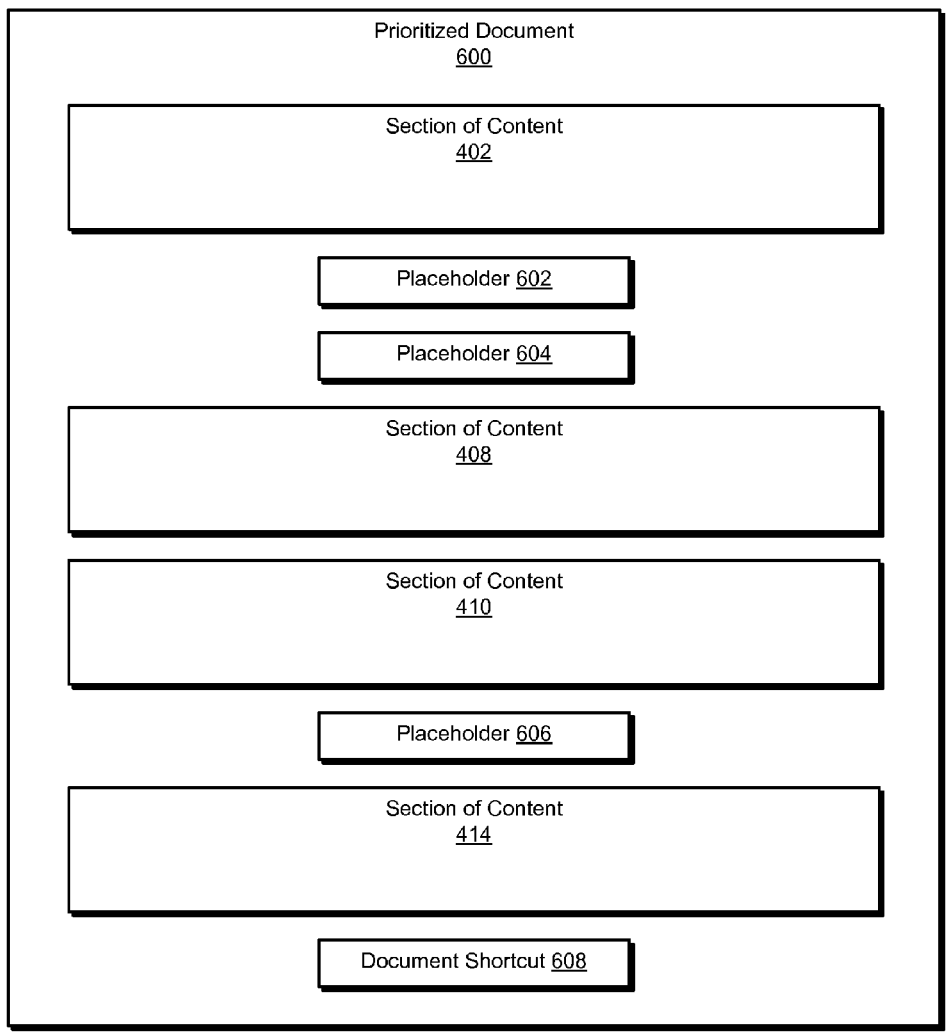
FIG. 6 is an illustration of an exemplary prioritized document.

Another example of document preview 146 is provided in FIG. 6. FIG. 6 is an illustration of an exemplary prioritized document 600. In one example, exemplary prioritized document 600 may represent document preview 146. As illustrated in this figure, document preview 146 may include sections of content 402, 408, 410, and 414. In this example, sections of content 402, 408, 410, and 414 may represent display-prioritized sections of content of archived document 142 that have priority levels indicating that they should be displayed prior to the entire archived document being retrieved.

In addition, document preview 146 may include placeholders 602, 604, and 606. Placeholders 602, 604, and 606 may represent content placeholders that references sections of content 404, 406, and 412 respectively. In this example, sections of content 404, 406, and 412 have priority levels indicating that they should not be retrieved prior to sections of content 402, 408, 410, and 414 of archived document 142 being displayed.

As shown in FIG. 6, document preview 146 may also include a document shortcut 608, which may represent a content placeholder referencing the entire archived document 142.

Returning to step 308, in another example, document-archive module 110 may archive document 140 by storing a copy of document 140 (i.e., archived document 142) in document archive 122, and by storing the prioritization tags identified as part of step 306 to prioritization tags 126.

In at least one embodiment, document-archive module 110 may archive document 140 by storing, in, document archive 122, a copy of document 140 (i.e., archived document 142), prioritization information that indicates the priority levels of sections of content 402-414, and/or prioritization tags associated with sections of content 402-414 that identify the priority levels associated with sections of content 402-414.

In some embodiments, document-archive module 110 may maintain at least a portion of document archive 122 on server 206 and/or computing device 202. Additionally, in at least one embodiment, document-archive module 110 may synchronize the contents of document archive 122 on computing device 202 with the contents of document archive 122 on server 206.

At step 310, the systems described herein may provide prioritized access to content within the archived document in accordance with the priority level associated with the section of content in order to allow a user to access a portion of the archived document without having to access the entire archived document. For example, prioritized-access module 112 may, as part of computing device 202 and/or server 206, provide prioritized access to sections of content 402-414 within document 140 in accordance with the priority levels associated with sections of content 402-414 in order to allow a user to access one or more of sections of content 402-414 of document 140 without having to access all of sections of content 402-414.

The systems described herein may perform step 310 in a variety of ways. In some embodiments, prioritized-access module 112 may provide prioritized access to content within document 140 by first displaying, to the user, a shortcut to archived document 142 (e.g., document shortcut 144 created as part of step 308). For example, prioritized-access module 112 may display the shortcut in place of document 140. The user may then use document shortcut 142 to request, from prioritized-access module 112, access to archived document 142.

In response to receiving a request from the user to access archived document 142 using document shortcut 144, prioritized-access module 112 may retrieve, from document archive 122, a portion or all of archived document 142 depending on what priority levels are associated with sections of content 402-414 within archived document 142.

For example, prioritized-access module 112 may retrieve, from document archive 122, a retrieval-prioritized portion of archived document 142 if archived document 142 contains one or more retrieval-prioritized sections of content that have priority levels indicating that the one or more retrieval-prioritized sections of content should be retrieved prior to the entire archived document being retrieved. Otherwise, prioritized-access module 112 may retrieve the entire archived document 142.

In various embodiments, a user and/or an administrator may specify what sections of content should be included and/or excluded in the retrieval-prioritized portion of archived document 142 prior to prioritized-access module 112 retrieving the retrieval-prioritized portion of archived document 142. For example, a user may request that the retrieval-prioritized portion of archived document 142 include all sections of content with prioritization levels above a specified level. In another example, the user may request that the retrieval-prioritized portion of archived document 142 include all sections of content that are associated with one or more specified prioritization tags.

After retrieving a portion of archived document 142 from document archive 122, prioritized-access module 112 may display, to the user, a portion or all of the retrieved portion of archived document 142 depending on what priority levels are associated with the sections of content included in the retrieved portion of archived document 142.

For example, prioritized-access module 112 may display, to the user, a display-prioritized portion of archived document 142 if the retrieved portion of archived document 142 contains one or more display-prioritized sections of content that have priority levels indicating that the one or more display-prioritized sections of content should be displayed prior to the entire archived document 142 being displayed. Otherwise, prioritized-access module 112 may display the entire retrieved portion of archived document 142.

In certain embodiments, a user and/or an administrator may specify what sections of content should be included and/or excluded in the display-prioritized portion of archived document 142 prior to prioritized-access module 112 displaying the display-prioritized portion of archived document 142. For example, a user may request that the display-prioritized portion of archived document 142 include all sections of content with prioritization levels above a specified level. In another example, the user may request that the display-prioritized portion of archived document 142 include all sections of content that are associated with one or more specified prioritization tags.

In the case that not all sections of content of archived document 142 are displayed to the user, prioritized-access module 112 may display at least one content placeholder referencing one or more low-priority sections of content that have priority levels indicating that the one or more low-priority sections of content should not be displayed prior to the display-prioritized portion of archived document 142 being displayed.

An example of the display-prioritized portion of archived document 142 is provided in FIG. 6. FIG. 6 is an illustration of an exemplary prioritized document 600. In this example, exemplary prioritized document 600 may represent the display-prioritized portion of archived document 142 described above. As illustrated in this figure, the display-prioritized portion of archived document 142 may include sections of content 402, 408, 410, and 414. In this example, sections of content 402, 408, 410, and 414 may represent display-prioritized sections of content of archived document 142 that have priority levels indicating that they should be displayed prior to sections of content 404, 406, and 412 of archived document 142 being displayed.

In addition, the display-prioritized portion of archived document 142 may include placeholders 602, 604, and 606. Placeholders 602, 604, and 606 may represent content placeholders that references sections of content 404, 406, and 412 respectively. In this example, sections of content 404, 406, and 412 have priority levels indicating that they should not be displayed prior to sections of content 402, 408, 410, and 414 of archived document 142 being displayed.

As shown in FIG. 6, the display-prioritized portion of archived document 142 may also include a document shortcut 608, which may represent a content placeholder referencing the entire archived document 142.

Returning to step 310, in at least one embodiment, prioritized-access module 112 may receive, from the user, a request to access a low-priority section of content referenced by a content placeholder (e.g., placeholder 602, 604, or 606 shown in FIG. 6). In response to receiving the request, prioritized-access module 112 may display, to the user, the low-priority section of content if prioritized-access module 112 has already retrieved the low-priority section of content. Otherwise, prioritized-access module 112 may retrieve, from document archive 122, the low-priority section of content and/or the entire archived document 142 and then display, to the user, the low-priority section of content and/or the entire archived document 142.

In other embodiments, prioritized-access module 112 may provide prioritized access to content within archived document 142 by displaying, to the user, a preview of archived document 142 (e.g., document preview 146 created as part of step 308). For example, prioritized-access module 112 may display document preview 146 in place of document 140. The user may then use document preview 146 to view the display-prioritized portion of archived document 142 contained within document preview 146 and/or to request, from prioritized-access module 112, access to one of the remaining low-priority sections of content of archived document 142.

In response to receiving a request, from the user, to access one of the remaining low-priority sections of content of archived document 142, prioritized-access module 112 may retrieve, from document archive 122, a portion or all one of the remaining low-priority sections of content of archived document 142 depending on what priority levels are associated with the remaining low-priority sections of content of archived document 142.

For example, in response to receiving the request, prioritized-access module 112 may retrieve, from document archive 122, the low-priority section of content and/or the entire archived document 142 and then display, to the user, the low-priority section of content or the entire archived document 142.

In at least one embodiment, prioritized-access module 112 may provide prioritized access to archived document 142 using an Internet browser. For example, a user may send, over the Internet, a request to access archived document 142 using an Internet browser. After which, prioritized-access module 112 may provide, over the Internet, prioritized access to archived document 142 through the Internet browser.

As detailed above, by archiving and displaying lengthy documents based on content priority levels, the systems and methods disclosed herein may be able to help a user more efficiently archive and view lengthy documents. For example, the systems and methods disclosed herein may allow a user to retrieve a lengthy archived document more efficiently from a document archive by allowing the user to retrieve only prioritized sections of the lengthy archived document, which may reduce retrieval times (especially when retrieval is made over a slow network connection) and/or conserve system resources (e.g., system bandwidth). In another example, the systems and methods disclosed herein may allow the user to view a lengthy archived document more efficiently by allowing the user to view only prioritized sections of the lengthy archived document, which may allow the user to focus on and/or identify information within the lengthy archived document that is most important and/or relevant to the user.

Figure 7:
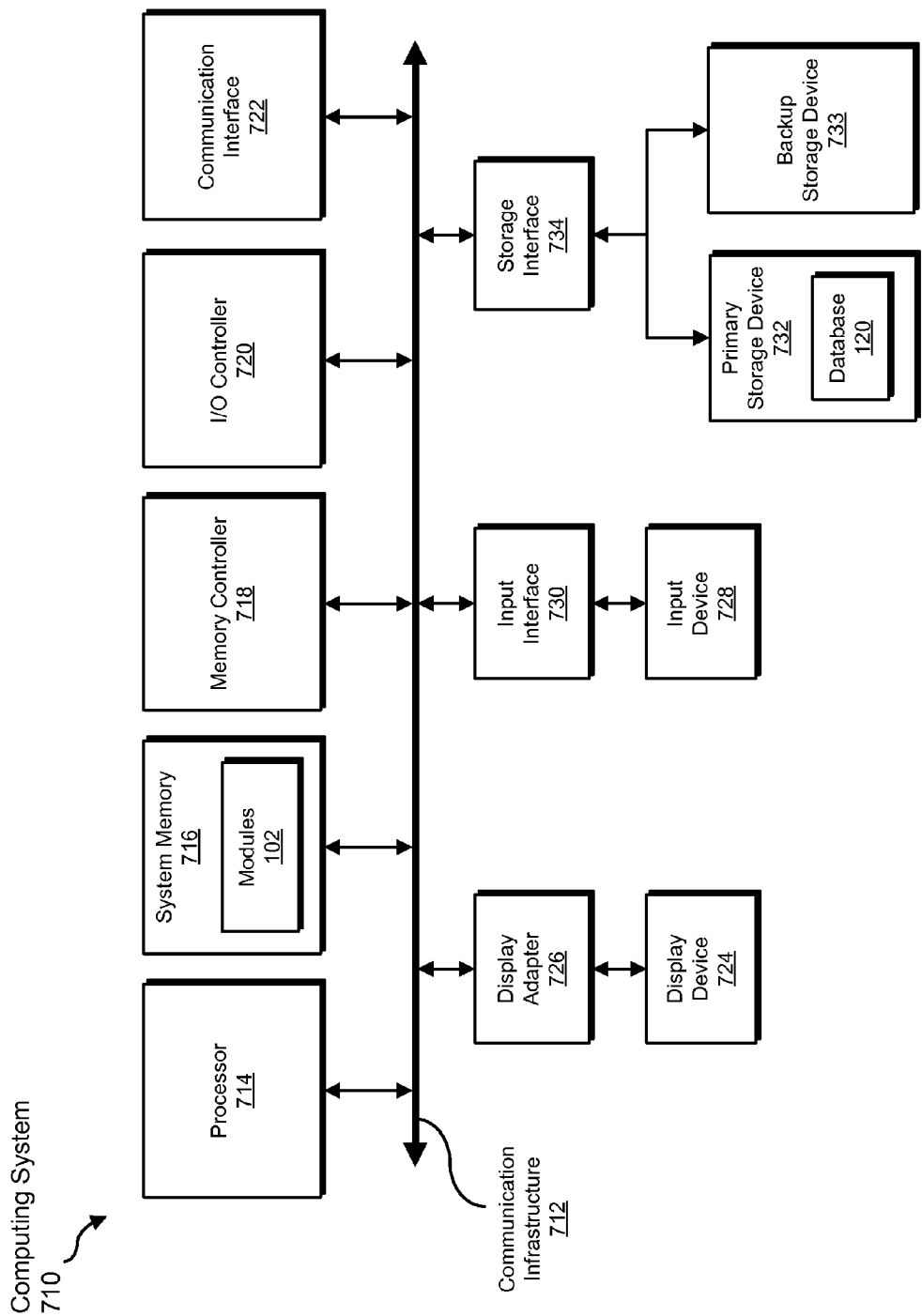
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 410 may perform and/or be a means for performing, either alone or in combination with other elements, one or more of the archiving, identifying, prioritizing, providing, receiving, allowing, storing, displaying, using, retrieving, performing, associating, and updating steps described herein. All or a portion of computing system 410 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 710. All or a portion of the computer program stored on the computer-readable-storage medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
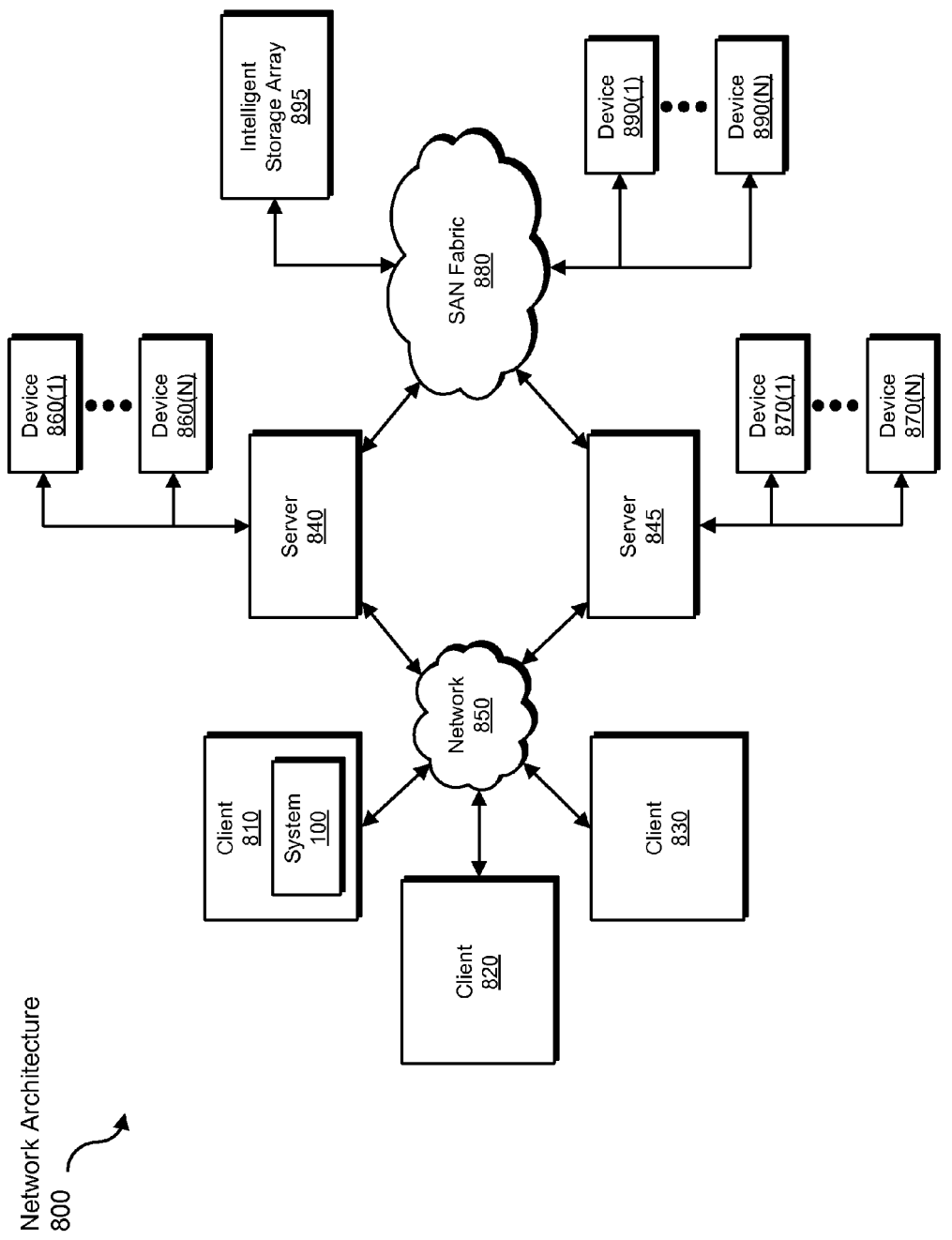
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the archiving, identifying, prioritizing, providing, receiving, allowing, storing, displaying, using, retrieving, performing, associating, and updating steps disclosed herein. All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, client systems 810, 820, and/or 830 and/or servers 840 and/or 845 may include all or a portion of system 100 from FIG. 1.

As illustrated in FIG. 8, one or more storage devices 860 (1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890 (1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for archiving and displaying lengthy documents based on content priority levels.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device (such as computing device 202 and/or server 206 in FIG. 2) into a computing device that is capable of archiving and displaying lengthy documents and/or providing prioritized access to content within lengthy documents based on content priority levels.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for archiving and displaying lengthy documents based on content priority levels, at least a portion of the method being performed by a computing device comprising at least one processor, the method comprising:
    receiving, from a user, a document that is to be archived, wherein:
        the document comprises a plurality of sections of content;
        the user has prioritized at least one section of content within the document;
    after the document has been received from the user:
        identifying the prioritized section of content within the document;
        identifying a priority level associated with the prioritized section of content within the document, the priority level prioritizing access to the prioritized section of content relative to at least one other section of content within the document;
        archiving the document based at least in part on the priority level associated with the prioritized section of content;
        providing, to the user, prioritized access to content within the archived document in accordance with the priority level associated with the prioritized section of content in order to allow the user to access a portion of the archived document without having to access the entire archived document.

2. The computer-implemented method of claim 1, wherein identifying the priority level associated with the prioritized section of content comprises identifying a prioritization tag that has been associated with the section of content by the user, wherein the prioritization tag identifies the priority level associated with the prioritized section of content.

3. The computer-implemented method of claim 2, wherein archiving the document comprises archiving the document based at least in part on the prioritization tag associated with the prioritized section of content.

4. The computer-implemented method of claim 2, further comprising, prior to identifying the prioritization tag that has been associated with the prioritized section of content by the user:
    receiving, from an administrator, a set of prioritization tags defined by the administrator, wherein:
        each prioritization tag within the set of prioritization tags identifies a priority level that has been defined by the administrator;
        the set of prioritization tags comprises the prioritization tag;
    allowing the user to associate the prioritization tag with the prioritized section of content.

5. The computer-implemented method of claim 1, wherein archiving the document comprises storing, in a document archive, at least one of:
    the document;
    prioritization information that indicates the priority level of the prioritized section of content;
    a prioritization tag associated with the prioritized section of content, wherein the prioritization tag identifies the priority level associated with the prioritized section of content.

6. The computer-implemented method of claim 5, wherein providing prioritized access to content within the archived document comprises:
    displaying, to the user, a shortcut to the archived document, the shortcut comprising a link to the archived document stored in the document archive;

receiving, from the user, a request to access the archived document using the shortcut to the archived document;
in response to receiving the request to access the archived document, retrieving, from the document archive, at least one of:
  a retrieval-prioritized portion of the archived document, the retrieval-prioritized portion of the archived document comprising one or more retrieval-prioritized sections of content that have priority levels indicating that the one or more retrieval-prioritized sections of content should be retrieved prior to the entire archived document being retrieved;
  the entire archived document;
displaying, to the user, at least one of:
  the retrieval-prioritized portion of the archived document;
  a display-prioritized portion of the archived document, the display-prioritized portion of the archived document comprising one or more display-prioritized sections of content that have priority levels indicating that the one or more display-prioritized sections of content should be displayed prior to the entire archived document being displayed;
  at least one content placeholder, the content placeholder referencing one or more low-priority sections of content that have priority levels indicating that the one or more low-priority sections of content should not be displayed prior to the display-prioritized portion of the archived document being displayed.

7. The computer-implemented method of claim 6, further comprising:
receiving, from the user, a request to access a low-priority section of content referenced by the content placeholder;
in response to receiving the request to access the low-priority section of content, performing at least one of:
retrieving, from the document archive, at least one of:
  the low-priority section of content;
  the entire archived document;
displaying, to the user, at least one of:
  the low-priority section of content;
  the entire archived document.

8. The computer-implemented method of claim 5, wherein providing prioritized access to content within the archived document comprises:
displaying, to the user, a preview of the archived document, the preview of the archived document comprising at least one of:
  a display-prioritized portion of the archived document, the display-prioritized portion of the archived document comprising one or more display-prioritized sections of content that have priority levels indicating that the one or more display-prioritized sections of content should be displayed prior to the entire archived document being retrieved;
  at least one content placeholder, the content placeholder referencing one or more low-priority sections of content that have priority levels indicating that the one or more low-priority sections of content should not be retrieved prior to the display-prioritized portion of the archived document being displayed;
receiving, from the user, a request to access at least one of:
  a low-priority section of content referenced by the content placeholder;
  the entire archived document;
in response to receiving the request, retrieving, from the document archive, at least one of:
  the low-priority section of content;
  the entire archived document;
displaying, to the user, at least one of:
  the low-priority section of content;
  the entire archived document.

9. The computer-implemented method of claim 1, wherein:
the document comprises an email;
the document is received from the user via an email client of the user;
prioritized access to the content within the archived document is provided via the email client of the user.

10. The computer-implemented method of claim 1, wherein:
at least a portion of the document was generated by the user using a document template, the document template comprising at least one section of pre-composed content, wherein the pre-composed content is associated with a predetermined priority level;
identifying the prioritized section of content within the document comprises identifying the section of pre-composed content within the document;
identifying the priority level associated with the prioritized section of content within the document comprises identifying the predetermined priority level associated with the section of pre-composed content.

11. The computer-implemented method of claim 1, wherein:
identifying the prioritized section of content within the document comprises:
  identifying a prioritization rule that has been associated with the document by the user, the prioritization rule comprising:
    a content-section identifier;
    a predetermined priority level associated with the content-section identifier, the predetermined priority level prioritizing access to sections of content identified using the content-section identifier;
  identifying the prioritized section of content using the content-section identifier;
identifying the priority level associated with the prioritized section of content within the document comprises:
  identifying the predetermined priority level associated with the content-section identifier:
  associating the predetermined priority level with the prioritized section of content.

12. The computer-implemented method of claim 1, wherein the priority level indicates at least one of:
a retrieval-prioritization of the prioritized section of content;
a display-prioritization of the prioritized section of content;
when the prioritized section of content should be displayed relative to the other section of content;
when the prioritized section of content should be retrieved from the document archive relative to the other section of content;
that the prioritized section of content should be displayed prior to the other section of content being displayed;
that the prioritized section of content should not be displayed prior to the other section of content being displayed;
that the prioritized section of content should be retrieved from the document archive prior to the other section of content being retrieved;
that the prioritized section of content should not be retrieved from the document archive prior to the other section of content being retrieved.

13. The computer-implemented method of claim 1, wherein the document comprises at least one of:
- an email;
- a presentation document;
- a spreadsheet document;
- a document attachment;
- an email attachment.

14. The computer-implemented method of claim 1, further comprising updating the priority level associated with the prioritized section of content.

15. A system for archiving and displaying lengthy documents based on content priority levels, the system comprising:
- a document-identification module programmed to receive, from a user, a document that is to be archived, wherein:
  - the document comprises a plurality of sections of content;
  - the user has prioritized at least one section of content within the document;
- a content-identification module programmed to identify, after the document has been received from the user, the prioritized section of content within the document;
- a priority-identification module programmed to identify, after the document has been received from the user, a priority level associated with the prioritized section of content within the document, the priority level prioritizing access to the prioritized section of content relative to at least one other section of content within the document;
- a document-archive module programmed to archive, after the document has been received from the user, the document based at least in part on the priority level associated with the prioritized section of content;
- a prioritized-access module programmed to provide, to the user and after the document has been received from the user, prioritized access to content within the archived document in accordance with the priority level associated with the prioritized section of content in order to allow the user to access a portion of the archived document without having to access the entire archived document;
- at least one processor configured to execute the document-identification module, the content-identification module, the priority-identification module, the document-archive module, and the prioritized-access module.

16. The system of claim 15, wherein the priority-identification module is programmed to identify the priority level associated with the prioritized section of content by identifying a prioritization tag that has been associated with the prioritized section of content by the user, wherein the prioritization tag identifies the priority level.

17. The system of claim 16, wherein the document-archive module is programmed to archive the document by archiving the document based at least in part on the prioritization tag associated with the prioritized section of content.

18. The system of claim 16, wherein the priority-identification module is programmed to, prior to identifying the prioritization tag that has been associated with the prioritized section of content by the user:
- receive from an administrator, a set of prioritization tags defined by the administrator, wherein:
  - each prioritization tag within the set of prioritization tags identifies a priority level that has been defined by the administrator;
  - the set of prioritization tags comprises the prioritization tag;
- allow the user to associate the prioritization tag with the prioritized section of content.

19. The system of claim 15, wherein the document-archive module is programmed to archive the document by storing, in a document archive, at least one of:
- the document;
- prioritization information that indicates the priority level of the prioritized section of content;
- a prioritization tag associated with the prioritized section of content, wherein the prioritization tag identifies the priority level associated with the prioritized section of content.

20. A computer-readable-storage medium comprising one or more computer-executable instructions that, when executed by at least one processor of a computing device, cause the computing device to:
- receive, from a user, a document that is to be archived, wherein:
  - the document comprises a plurality of sections of content;
  - the user has prioritized at least one section of content within the document;
- after the document has been received from the user:
  - identify the prioritized section of content within the document;
  - identify a priority level associated with the prioritized section of content within the document, the priority level prioritizing access to the prioritized section of content relative to at least one other section of content within the document;
  - archive the document based at least in part on the priority level associated with the prioritized section of content;
  - provide, to the user, prioritized access to content within the archived document in accordance with the priority level associated with the prioritized section of content in order to allow the user to access a portion of the archived document without having to access the entire archived document.

* * * * *